US012734899B2

(12) United States Patent
Takahashi et al.

(10) Patent No.: US 12,734,899 B2
(45) Date of Patent: Sep. 15, 2026

(54) VEHICLE DRIVE DEVICE

(71) Applicants: MITSUBISHI JIDOSHA KOGYO KABUSHIKI KAISHA, Tokyo (JP); MEIDENSHA CORPORATION, Tokyo (JP)

(72) Inventors: Tsuyoshi Takahashi, Tokyo (JP); Kiminobu Terao, Tokyo (JP); Yosuke Morimoto, Okazaki (JP); Takuya Ogasawara, Okazaki (JP); Hiromichi Akiyama, Tokyo (JP); Dai Oono, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 280 days.

(21) Appl. No.: 18/693,470

(22) PCT Filed: Sep. 28, 2022

(86) PCT No.: PCT/JP2022/036091
§ 371 (c)(1),
(2) Date: Mar. 19, 2024

(87) PCT Pub. No.: WO2023/054439
PCT Pub. Date: Apr. 6, 2023

(65) Prior Publication Data
US 2024/0399883 A1 Dec. 5, 2024

(30) Foreign Application Priority Data
Oct. 1, 2021 (JP) ................................ 2021-162479
Oct. 1, 2021 (JP) ................................ 2021-162480

(51) Int. Cl.
*B60L 15/00* (2006.01)
*B60K 1/02* (2006.01)
(Continued)

(52) U.S. Cl.
CPC .............. *B60L 15/007* (2013.01); *B60K 1/02* (2013.01); *B60L 50/51* (2019.02); *B60K 1/04* (2013.01)

(58) Field of Classification Search
CPC .... B60L 15/007; B60L 50/51; B60L 2220/42; B60K 1/02; B60K 1/04; B60K 2001/003;
(Continued)

(56) References Cited

U.S. PATENT DOCUMENTS

2015/0305188 A1* 10/2015 Maeda .................... H05K 7/02 361/728
2023/0238911 A1* 7/2023 Kobayashi ............. H02P 29/68 318/471
2023/0328911 A1* 10/2023 Helwich ................ B60L 50/51 361/752

FOREIGN PATENT DOCUMENTS

JP 2016-199136 A 12/2016
JP 2017-184523 A 10/2017
(Continued)

OTHER PUBLICATIONS

International Search Report for PCT/JP2022/036091 mailed on Dec. 13, 2022.
(Continued)

*Primary Examiner* — Edwin A Young
(74) *Attorney, Agent, or Firm* — Birch, Stewart, Kolasch & Birch, LLP

(57) ABSTRACT

The disclosed vehicle drive device (10) includes: motor housings (11,12), a gearbox housing (13), an inverter case (14), and a PN line (9). The motor housings (11,12) form respective exteriors of a left motor (1) and a right motor (2) that drive left and right wheels of a vehicle with electric power of a battery. The gearbox housing (13) incorporates therein a gearbox (3) that amplifies torque of the left and right motors and that transmits the amplified torque to the
(Continued)

left and right wheels, is sandwiched between the left and right motor housings (11,12), and is offset in a front-rear direction from the left and right motor housings (11,12). The inverter case (14) incorporates therein a pair of semiconductor modules (6,7) and is arranged above the left and right motor housings (11,12). The PN line (9) connects the battery to the semiconductor modules (6,7) from a lower surface side of the inverter case (14) so as to pass through a first space (41).

13 Claims, 7 Drawing Sheets

(51) Int. Cl.
*B60L 50/51* (2019.01)
*B60K 1/04* (2019.01)

(58) Field of Classification Search
CPC .... H05K 7/20927; H02K 7/116; F16H 57/02; F16H 2057/02026; F16H 2057/02034; F16H 2057/02052
See application file for complete search history.

(56) References Cited

FOREIGN PATENT DOCUMENTS

| | | | |
|---|---|---|---|
| JP | 2021-28183 A | | 2/2021 |
| JP | 2021029059 A | * | 2/2021 |

OTHER PUBLICATIONS

Written Opinion of the International Searching Authority for PCT/JP2022/036091 mailed on Dec. 13, 2022.

English translation of the International Preliminary Report on Patentability and Written Opinion of the International Searching Authority for International Application No. PCT/JP2022/036091, dated Apr. 2, 2024.

* cited by examiner

Front view

Left side view

Bottom view

VEHICLE DRIVE DEVICE

TECHNICAL FIELD

The present disclosure relates to a vehicle drive device that drives left and right wheels of a vehicle using electricity of a battery.

BACKGROUND TECHNIQUE

Conventionally, vehicle drive devices have been known which drive left and right wheels of the vehicle with two motors (electric motors). For example, one of the proposed vehicle drive devices connects motors one to each of the left and the right wheels so that the left and the right wheels can be driven independently from each other. Such a vehicle drive device can generate a rotational speed difference and a torque difference between the left and the right wheels by making the driving forces of the left and the right motors different from each other. This improves the turning performance of the vehicle and the stability of the vehicle body while turning (see Patent Document 1).

PRIOR ART REFERENCE

Patent Document

[Patent Document 1] Japanese Laid-open Patent Publication No. 2017-184523

SUMMARY OF INVENTION

Problems to be Solved by Invention

In the vehicle drive device as described above, an inverter for controlling the rotating state of the AC motor is incorporated. The DC power of a battery mounted on a vehicle is converted into AC power by the inverter and then supplied to left and right motors. In addition, a PN line (power supply line), through which electricity to be supplied from the battery to the inverter flows, is inserted from, for example, the upper surface or the back surface of the inverter and fastened and fixed to a busbar inside the inverter. This structure tends to increase the size in the vehicle front-rear direction of the inverter and makes it difficult to enhance the mountability of a vehicle. In addition, if a suspension device or another structure (for example, a suspension cross member or a stabilizer) is disposed around the vehicle drive device, the PN line may be unable to be connected to the upper surface or the back surface of the inverter due to a constraint of the layout.

The power supply line (PN line) from the battery to the inverter may be inserted into the inverter from the upper surface or the rear surface of the inverter, being inserted into a ferrite core, which is provided as a countermeasure against noise, and then may be fastened and fixed to the busbar in the inverter. This structure, for example, easily increases the size in the vehicle front-rear direction of the inverter and therefore has difficulty in enhancing the mountability of the vehicle. In addition, if the ferrite core is provided so as to largely protrude to the outside of the inverter, it is difficult to reduce the size of the entire device, and the vehicle mountability may be deteriorated.

With the foregoing problems in view, one of the objects of the present disclosure is to provide a vehicle drive device capable of enhancing the vehicle mountability with a simple structure. In addition to this object, actions and effects which are derived from each configuration of an embodiment to carry out the invention to be described below and which conventional technique does not attain can be set as other objects of the present disclosure.

Means to Solve Problem

The disclosed vehicle drive device includes: left and right motor housings that form respective exteriors of left and right motors, the left and right motors driving left and right wheels of a vehicle with electric power of a battery; a gearbox housing that incorporates therein a gearbox, that is sandwiched between the left and right motor housings, and that is offset in a front-rear direction from the left and right motor housings, the gearbox amplifying torque of the left and right motors and transmitting the amplified torque to the left and right wheels; an inverter case that incorporates therein a pair of semiconductor modules and that is arranged above the left and right motor housings, the pair of semiconductor modules converting direct current to alternating current and supplying the alternating current to the left and right motors; and a PN line that connects the battery to the semiconductor modules from a lower surface side of the inverter case so as to pass through a first space bulging in a front-rear direction, the first space being enclosed by the left and right motor housings and the gearbox housing.

Effects of Invention

The vehicle drive device disclosed herein can enhance the mountability of a vehicle with a simple structure.

EMBODIMENTS TO CARRY OUT INVENTION

1. Structure

Figure 1:
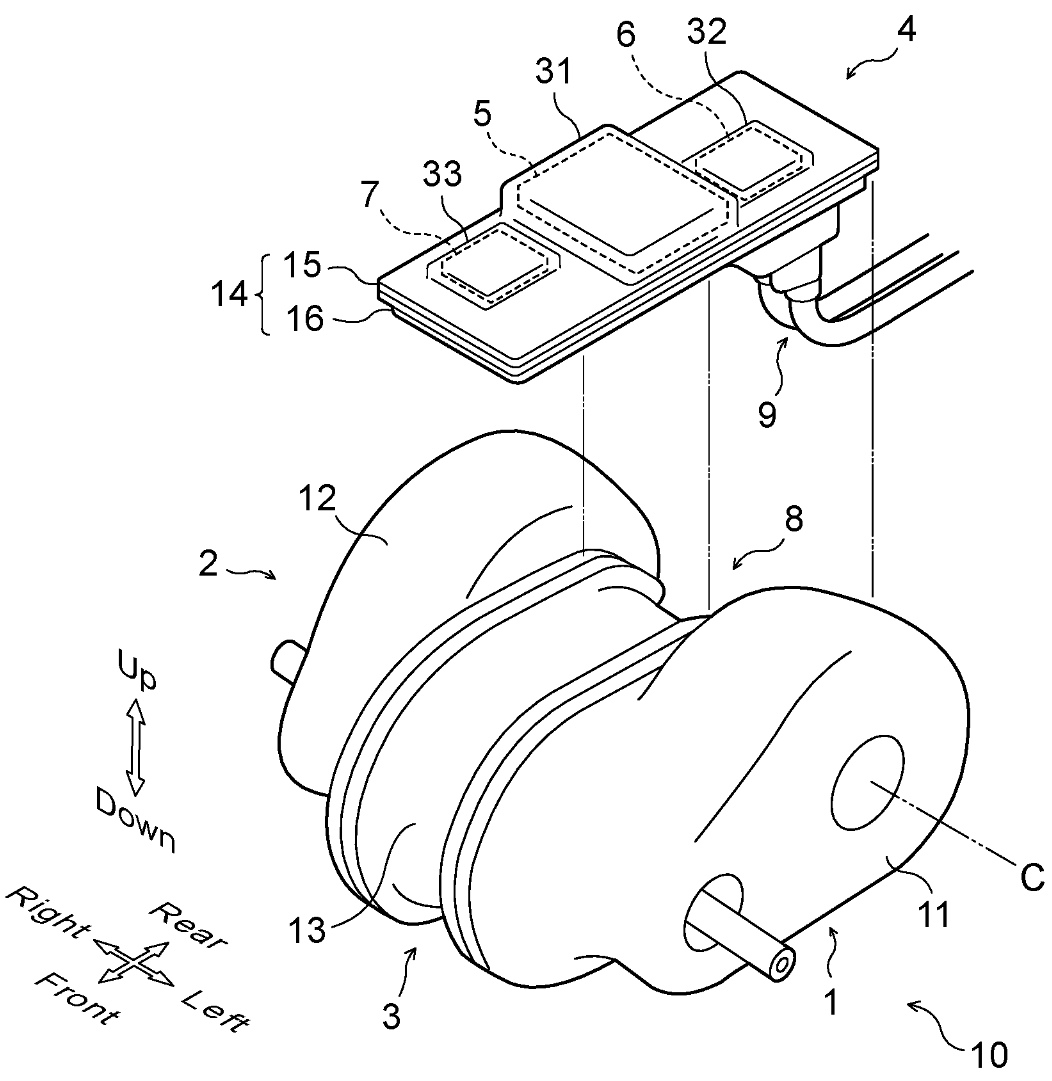
FIG. 1 is an exploded perspective view of a vehicle drive device according to an embodiment.

FIG. 1 to FIG. 7 are diagrams for explaining the structure of a vehicle drive device 10 according to the present embodiment and a modification. The front-rear, left-right, and up-down directions in the drawings represent directions determined with reference to the driver of a vehicle on which vehicle drive device 10 is mounted. As shown in FIG. 1, the vehicle drive device 10 is provided with a left motor 1, a right motor 2, a gearbox 3, and an inverter 4. The left motor 1 and the right motor 2 are electric motors that receive electric power from a battery mounted on the vehicle and drive left and right wheels of the vehicle.

The left motor 1 is connected to a power transmission path connected to at least the left wheel shaft. Similarly, the right motor 2 is connected to a power transmission path connected to at least the right wheel shaft. In an electric vehicle or a hybrid vehicle mounted thereon another driving motor or an internal combustion engine, the left motor 1 and the right motor 2 function as a yaw moment generating source that generates turning force by increasing or decreasing at least driving force and braking force of left and right wheels. Further, in an electric vehicle not mounted thereon any other driving motor, the motors 1,2 also have a function as a driving source of the vehicle in addition to the above-described function.

Figure 3:
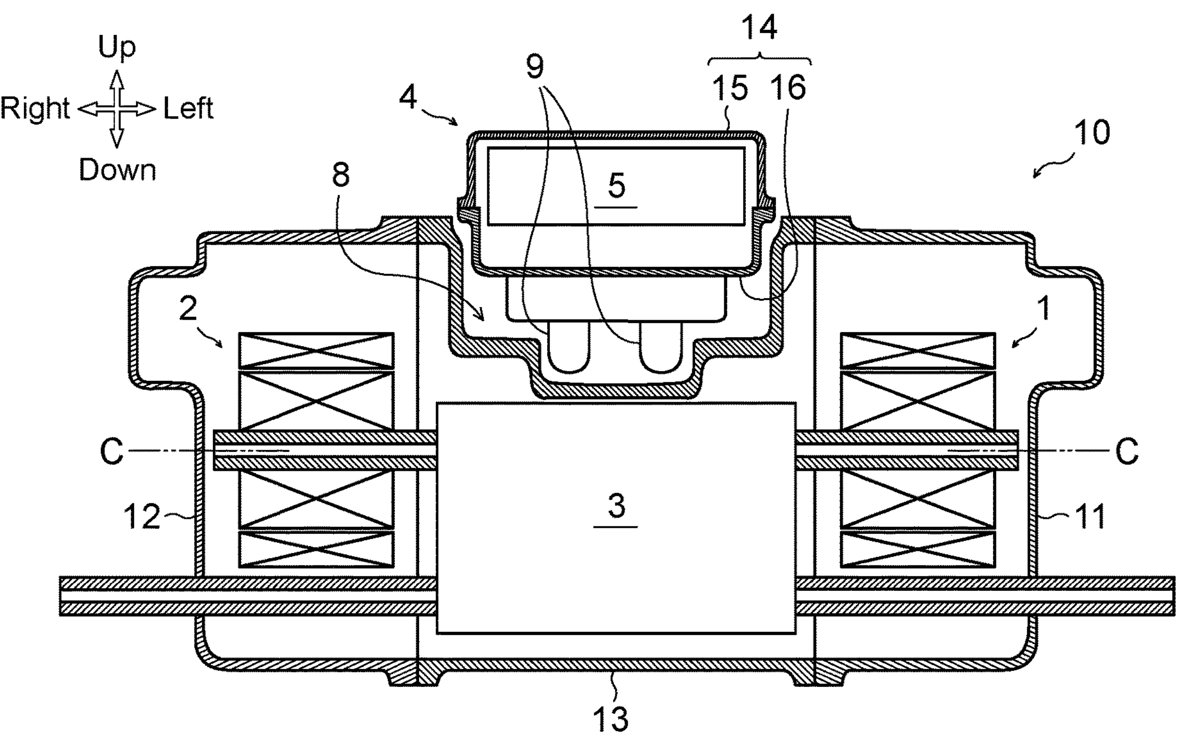
FIG. 3 is a sectional view illustrating an internal structure of the vehicle drive device of FIG. 1.

Each of the left motor 1 and the right motor 2 has a configuration incorporating therein motor elements such as a stator, a rotor, and a motor shaft. These elements are accommodated in left and right motor housings 11,12 (left motor housing 11, right motor housing 12) that form the exteriors of the respective motors 1,2, as shown in FIG. 3. The stator is a stator which has a structure, for example, that winds a coil around a laminated iron core formed by depositing insulating steel sheets and is fixed to the corresponding motor housing 11 or 12. The rotor is, for example, a cylindrical rotor in which a permanent magnet is inserted into a laminated iron core formed by depositing insulating steel sheets and is loosely inserted into the inside of the stator concentrically with the central axis of the stator and fixed to an axial motor shaft. By changing the frequency of the AC power supplied to the stator, the rotational velocity of the magnetic field inside the stator is changed, and the angular velocity of the rotor and the motor shaft are changed. One end of the motor shaft is connected to the gearbox 3.

The gearbox 3 is a driving force transmission device sandwiched between the left and the right motor housings 11,12. The gearbox 3 includes a gearbox housing 13 that forms an exterior and a gear mechanism incorporated therein. The gear mechanism is a mechanism that amplifies the torques of the left motor 1 and the right motor 2 and transmits amplified torques to the left and the right wheels. In addition, the gear mechanism includes a mechanism (e.g., a differential gear mechanism, a planetary gear mechanism) for generating a torque difference between the left wheel shaft and the right wheel shaft.

Figure 2:
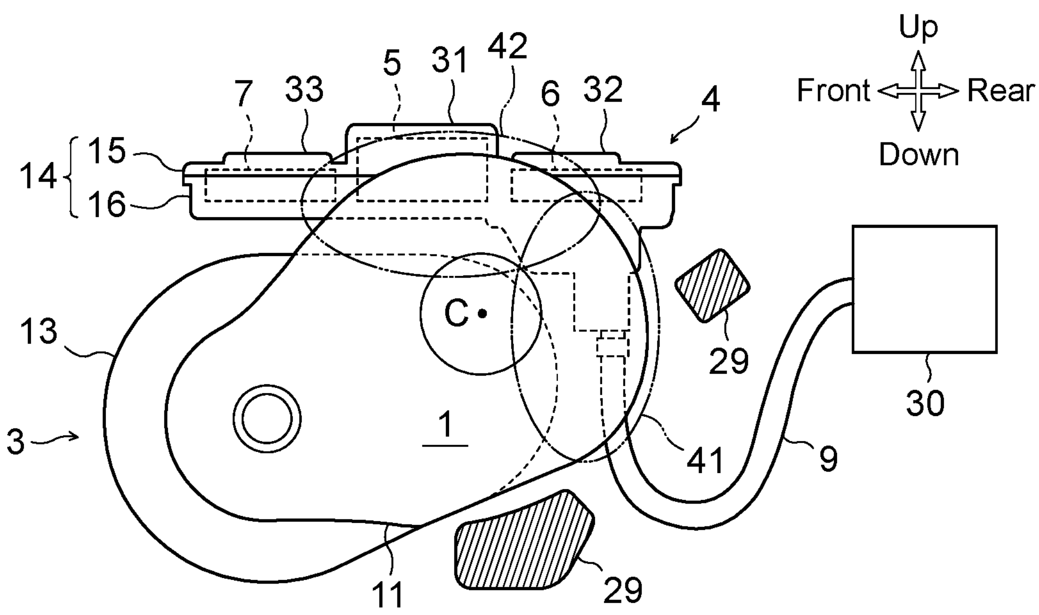
FIG. 2 is a left side view of the vehicle drive device of FIG. 1.

The gearbox housing 13 of the present embodiment is arranged so as to be offset in the front-rear direction and downward from the left and right motor housings 11,12. Specifically, as shown in FIG. 2, the positional relationship between the left motor housings 11, 12 and the gearbox housing 13 is set such that the gearbox 3 is displaced downward and forward of the vehicle on the basis of the rotating shafts C of the left motor 1 and the right motor 2 when seen from the side. Such a layout forms a depressed portion in a basin shape depressed in the front-rear direction and also downward between the left and right motor housings 11,12. As shown in FIG. 3, in the vehicle drive device 10 of the present embodiment, the inverter 4 is disposed inside the depressed portion 8 by making use of the depressed portion 8.

The inverter 4 is a converter (DC-AC inverter) that mutually converts the power (DC power) of a DC circuit and the power (AC power) of the AC circuits on the side of the motors 1,2. This inverter 4 has a function of converting DC power into AC power and supplying the converted AC power to both the left motor 1 and the right motor 2. Inside an inverter case 14, which forms the exterior of the inverter 4, a capacitor 5 and a pair of semiconductor modules 6, 7 (left semiconductor module 6 and right semiconductor module 7) are provided. An inverter case 14 is disposed above the left and right motor housings 11,12 (in the depressed portion 8 enclosed by the left and right motor housings 11,12 and the gearbox housing 13) and is fixed to the left and right motor housings 11, 12. The inverter case 14 is formed by combining an inverter upper case 15 having a shape covering the upper surface sides of the capacitor 5 and the semiconductor modules 6,7 and an inverter lower case 16 having a shape covering the lower surface side.

Here, among the depressed portion 8, a space adjacent in the front-rear direction to the left and right motor housings 11,12 when seen from the side is referred to as a first space 41. Among the space enclosed by the left and right motor housings 11, 12 and the gearbox housing 13, a space adjacent to the upper sides of the left and right motor housings 11,12 when viewed from the side is referred to as a second space 42. These first space 41 and the second space 42 are indicated by the two-dot chain lines in FIG. 2. The first space 41 is formed in such a shape (bulging shape) that the front side or the rear side thereof protrudes in the front-rear direction. In addition, the second space 42 is formed in such a shape (bulging shape) that the lower side thereof protrudes downward. The inverter case 14 is arranged in the second space 42.

The capacitor 5 is an electronic component that smooths electric power to be supplied to the motors 1,2. In a current controlled inverter, the capacitor 5 is disposed on an electricity supply line of AC power converted in the semiconductor modules 6,7. In a voltage controlled inverter, the capacitor 5 is disposed on an input side of DC power. The capacitor 5 functions as a kind of filter to stabilize the current supplied to the motors 1,2.

The semiconductor modules 6, 7 are each a power module formed by forming a three-phase bridging circuit including multiple switching elements, diodes, and the like on a substrate (substrate for an electronic circuit). By intermittently switching the connecting states of the respective switching elements, the DC power is converted into three-phase AC power. Examples of the switching elements include semiconducting devices such as thyristors, IGBTs (Insulated Gate Bipolar Transistors), and power MOSFETs (Metal Oxide Semiconductor Field-Effect Transistors). The AC power generated by the left (one) semiconductor module 6 is supplied to the left motor 1, and the AC power generated by the right (the other) semiconductor module 7 is supplied to the right motor 2.

As shown in FIGS. 1 and 2, a first bulging portion 31 having a shape bulging upward is formed at the center portion (center in the front-rear direction) of the inverter upper case 15. The capacitor 5 is mounted on the lower side and the inside of the first bulging portion 31, and is fixed so as to be suspended from the inverter upper case 15. Further, a second bulging portion 32 is formed on the vehicle rear side of the first bulging portion 31 and a third bulging portion 33 is formed on the vehicle front side of the first bulging portion 31. Like the capacitor 5, the semiconductor modules 6,7 are mounted on the lower sides and the insides of the bulging portions 32,33, respectively and are fixed so as to be suspended from the inverter upper case 15.

Figure 4:
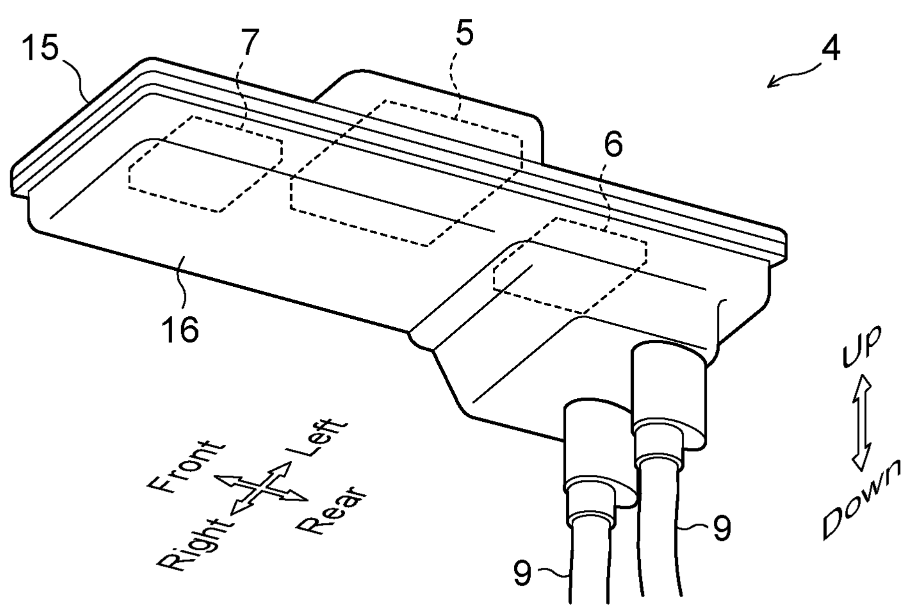
FIG. 4 is a perspective view illustrating an inverter of the vehicle drive device of FIG. 1.

As shown in FIGS. 2 and 4, the PN lines 9 for supplying electricity that connect the battery to the semiconductor modules 6,7 are connected from a lower surface side of the inverter case 14 so as to pass through the first space 41. The connecting point between each PN line 9 and the inverter case 14 is disposed in a space that is on the rear side of the gearbox housing 13 and that is sandwiched between the left and right motor housings 11,12. The PN line 9 is connected to a lower surface side of the inverter case 14 and is wired downward through a position on an opposite side to the gearbox housing 13 in the front-rear direction on the basis of the left and right motor housings 11,12.

In the present embodiment, as shown in FIG. 2, each PN line 9 extending from a junction box 30 is wired so as to avoid a suspension cross member 29 (suspension cross structural member). The junction box 30 is a device that relays the electric power from the battery and supplies it to the semiconductor modules 6,7 through the PN line 9, and is arranged on the rear side of the inverter case 14. The PN line 9 is connected to the rear portion of the lower surface side of the inverter case 14 and is connected to the junction box 30.

A suspension cross member 29 is a member that supports the left and right wheels of the vehicle via a suspension. Gearbox housing 13 and the left and right motor housings 11, 12 are installed above (on top of) suspension cross member 29. Each PN line 9 is wired to pass above a lower end portion of the suspension cross member 29. As described above, connecting the PN line 9 to the lower surface side of the inverter case 14 efficiently uses the space in the depressed portion 8 and makes the entire shape of the vehicle drive device 10 compact. In addition, since the PN lines 9 can be assembled from one direction on the rear side of the vehicle, the workability of connecting the PN lines 9 is greatly enhanced.

Figure 5A:
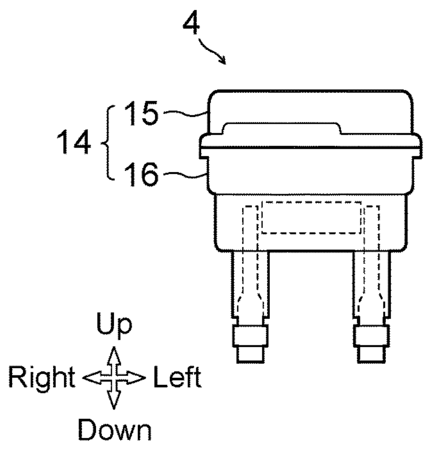
FIGS. 5A to 5C are three view drawings of the inverter of FIG. 4.
Figure 5A:
Figure 5B:
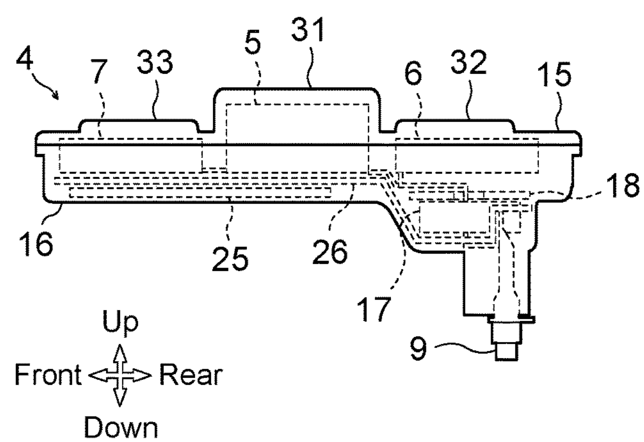
Figure 5C:
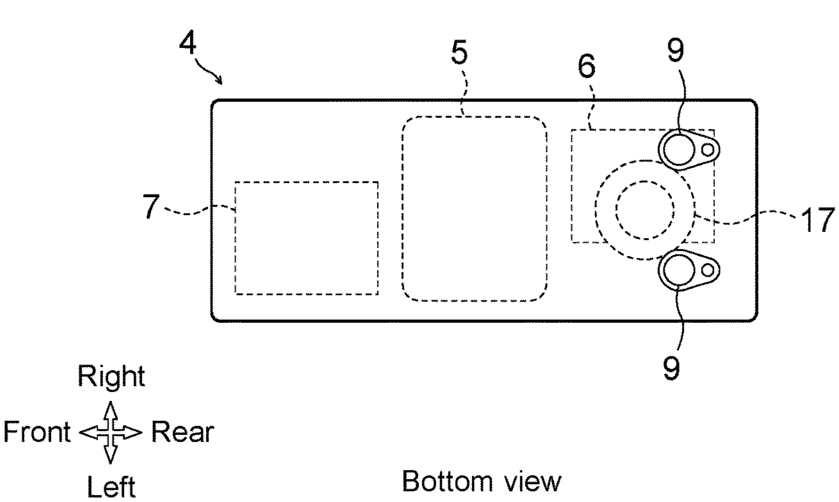
Figure 6:
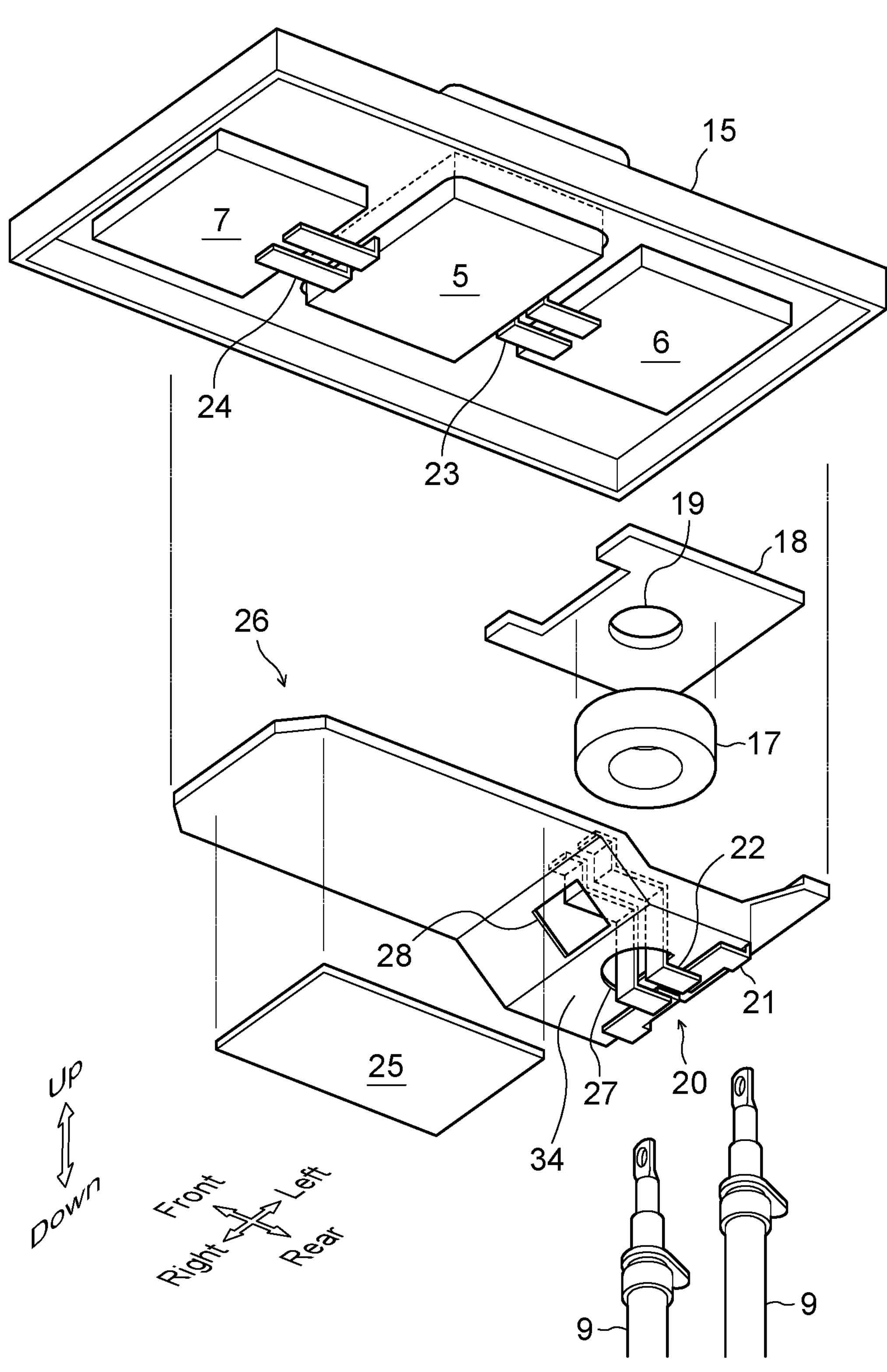
FIG. 6 is an exploded perspective view illustrating an internal structure of the inverter of FIG. 4.

FIGS. 5A-5C are three view drawings showing the internal structure of the inverter 4, and FIG. 6 is an exploded perspective view showing the inverter 4 from which the inverter lower case 16 is removed when seen obliquely upward from below. In the inverter case 14, a ferrite core 17, a resin plate 18, multiple busbars 20, a control substrate 25, and a resin member 26 are provided. The ferrite core 17 is a component provided as a countermeasure against noise of the inverter 4 and is a ceramic-made magnetic material formed into an annular shape (doughnut shape). As illustrated in FIGS. 5B and 5C, the ferrite core 17 is disposed under the left semiconductor module 6, and is partly arranged in the first space 41, for example.

The resin plate 18 is a plate-shape member being made of resin and being arranged between the ferrite core 17 and the left semiconductor module 6, and is suspended from and fixed to the inverter case inverter upper case 15. On the resin plate 18, an aperture 19 having a size corresponding to the through-hole of the ferrite core 17. In addition, inside the resin plate 18, a shield layer formed of a magnetic sheet that suppresses noise propagation is provided. This structure makes the electromagnetic wave generated in, for example, the left semiconductor module 6 less propagate to the lower side of the resin plate 18 and consequently suppresses electromagnetic interference to a control substrate 25. The control substrate 25 is a control substrate of the semiconductor modules 6,7.

Each busbar 20 is a conductor rod that efficiently transmits large electric current and is formed by bending rod- or plate-shaped metal member into a shape adaptable to the arrangement position. The busbar 20 is wired so as to pass through the interiors of the ferrite core 17 and the aperture 19. One end of the busbar 20 is connected to a PN line 9 at a position avoiding the ferrite core 17 when seen from below, as shown in FIGS. 5A to 5C and 6. The other end of the busbar 20 is connected to semiconductor modules 6,7.

The resin member 26 is a member that is made of resin and that holds the ferrite core 17, the busbars 20, and the control substrate 25 of the semiconductor modules 6,7. As shown in FIG. 6, a box-shaped portion 34 located right under the ferrite core 17 has a shape more depressed downward than the remaining portion and forms steps on the front and rear side of the ferrite core 17. Using these steps, the control substrate 25 is fixed to the resin member 26 on the front side of the ferrite core 17, being suspended downward. The control substrate 25 is attached on the lower surface side opposite to the upper surface side where the semiconductor modules 6,7 are positioned among the plate surfaces of the resin member 26. In addition, like the resin plate 18, a shield layer formed of a magnetic sheet that suppresses noise propagation is provided inside the resin member 26. This further suppresses electromagnetic interference to the control substrate 25.

On the lower surface of the box-shaped portion 34, a through-hole 27 having a size corresponding to through-hole of the ferrite core 17 is provided. Each busbar 20 is provided so as to penetrate the interiors of the ferrite core 17 and the aperture 19 through the through-hole 27. In addition, an operation through-hole 28 is provided on the side surface on the vehicle front portion of the box-shaped portion 34. The operation through-hole 28 is an aperture through which a tool is inserted when a fastening member provided to a connecting point between a busbar 20 and the left semiconductor module 6 is to be fastened.

Each busbar 20 illustrated in FIG. 6 includes a pair of first busbars 21, a pair of second busbars 22, a pair of third busbars 23, and a pair of fourth busbars 24. Each first bus bar 21 is connected to the corresponding PN line 9 via a fastening member and is arranged along the lower surface and the rear side surface of the box-shaped portion 34. Each second bus bar 22 is connected to the first bus bar 21 on the lower surface side of the box-shaped portion 34 and is connected to the left semiconductor module 6 through the through-hole of the ferrite core 17. The left semiconductor module 6 is connected to the PN lines 9 via the first busbars 21 and the second bus bars 22, and is supplied with the electric power of the battery. As the above, the busbars 20 are inserted into the inside of the annular-shaped ferrite core 17 from the lower part of the semiconductor modules 6,7 and are extended downward, and are extended toward the rear side of the ferrite core 17 in a posture along the plate surface of the resin member 26.

Each third bus bar 23 has one end co-fastened to the left semiconductor module 6 together via the fastening member and the other end connected to the capacitor 5. Each fourth bus bar 24 has one end connected to the right semiconductor module 7 and the other end connected to the capacitor 5. Inside the capacitor 5, the third bus bar 23 and the fourth bus bar 24 are electrically connected. The right semiconductor module 7 is connected to the PN lines 9 via the capacitor 5 as well as the busbars 21-24 and is supplied with the electric power of the battery.

2. Actions and Effects (A-1) In the vehicle drive device 10 described above, as shown in FIG. 2, the PN lines 9 extending from the junction box 30 are connected from the lower surface side of the inverter case 14 so as to pass through the first space 41. This structure can reduce the sizes in the front-rear direction and the up-down direction of the inverter 4, for example, as compared with a structure that the PN lines 9 are connected to the upper surface or the rear surface of the inverter case 14, therefore the entire shape of the inverter 4 can be made compact. Furthermore, among the depressed portion 8, the space on the rear side of the gearbox housing 13 can be efficiently used, thus size reduction of the vehicle drive device 10 can be accomplished. In addition, the protectability for the PN lines 9 can be enhanced because the circumference of the PN lines 9 is enclosed by the left and right motor housings 11,12, and the gearbox housing 13. Furthermore, since the PN lines 9 can be assembled from one direction on the rear side of the vehicle, the workability of connecting the PN lines 9 is greatly enhanced. Therefore, the vehicle drive device 10 described above can enhance the vehicle mountability with a simple structure.

(A-2) In the vehicle drive device 10 described above, as shown in FIG. 2, the gearbox housing 13 is offset downward from the left and right motor housings 11,12. In addition, the inverter case 14 is disposed in the second space 42 bulging downward. This makes it possible to reduce the size in the up-down direction of the vehicle drive device 10. Further, each PN line 9 connected to the lower surface side of the inverter case 14 is wired downward through a position on an opposite side to the gearbox housing 13 in the front-rear direction with respect to the left and right motor housings 11,12. With this structure, the dead space (i.e., the space of the rear and lower portion in the drawing of FIG. 2) and size reduction of the vehicle drive device 10 can be accomplished.

(A-3) In the vehicle drive device 10 described above, the PN lines 9 are wired to pass above a lower end portion of the suspension cross member 29. With this structure, the PN lines 9 can be wired without hindering the suspension function, and the circumference of the PN lines 9 can be protected by the suspension cross member 29.

(A-4) In the vehicle drive device 10 described above, the PN lines 9 are connected to the rear portion of the lower surface side of the inverter case 14 and is connected to the junction box 30. The junction box 30 is arranged at a position relatively close to the rear side of the inverter case 14. With such a structure, the wiring layout of the PN lines 9 can be simplified while the interference between PN lines 9 and the peripheral structures is avoided, therefore the workability of connecting of the PN lines 9 can be enhanced.

(A-5) In the vehicle drive device 10 described above, as shown in FIG. 5C, the PN lines 9 are connected to the inverter case 14 at positions avoiding the ferrite core 17. This structure can connect the PN lines 9 to the busbars 20 at a position of approximately the same height as the ferrite core 17, so that the overall PN lines 9 can be positioned upward. For example, even when an interfering object (the suspension cross member 29) is present below the vehicle drive device 10 as shown in FIG. 2, PN lines 9 can be wired without difficulty. Therefore, it is possible to enhance the degree of freedom in the layout of the PN lines 9, the vehicle drive device 10, and various devices (for example, the suspension cross member 29 and the junction box 30) arranged in the vicinity thereof.

(B-1) In the vehicle drive device 10 described above, as shown in FIG. 5B, the ferrite core 17 is disposed under the left semiconductor module 6. With such a structure, for example, comparing with a structure in which the ferrite core 17 is provided outside of the inverter case 14, the size in the vehicle front-rear direction of the inverter 4 can be reduced. Accordingly, the vehicle mountability of the vehicle drive device 10 can be improved with a simple configuration. Further, since the ferrite core 17 does not largely protrude to the outside of the inverter 4, the size of entire device can be reduced, and the vehicle mountability of the vehicle drive device 10 can be further enhanced.

In the vehicle drive device 10 described above, the PN line 9 that connect the battery and the busbar 20 to each other is connected to the lower surface side of inverter case 14. This structure can reduce the dimensions in the front-rear direction and the up-down direction of the inverter 4 as compared with a structure that the PN line 9 is connected to the upper surface or the rear surface of the inverter case 14, therefore the entire shape of the inverter 4 can be made compact. Furthermore, since the PN line 9 can be assembled from one direction on the rear side of the vehicle, the workability of connecting the PN line 9 is greatly enhanced.

(B-2) In the vehicle drive device 10 described above, the gearbox housing 13 is disposed so as to be offset in the front-rear direction with respect to the left and right motor housings 11, 12. The PN line 9 is connected to the lower surface side of the inverter case 14 so as to pass through the first space 41 surrounded by the motor housings 11,12 and the gearbox housing 13. Further, the ferrite core 17 is at least partly arranged in the first space 41. As described above, by partly arranging the ferrite core 17 in the first space 41, the circumference of the ferrite core 17 can be enclosed by the left and right motor housings 11,12 and the gearbox housing 13 so that the protectability of the ferrite core 17 can be enhanced. In addition, the protectability for the PN line 9 can be enhanced because the circumference of the PN line is enclosed by the left and right motor housings 11, 12, and the gearbox housing 13.

(B-3) In the vehicle drive device 10 described above, the resin plate 18 is disposed between the left semiconductor module 6 and the ferrite core 17 and is fixed to and suspended from the inverter upper case 15. Thus, the propagation of the electromagnetic wave generated in the left semiconductor module 6 can be suppressed, and the electromagnetic interference to the ferrite core 17 and control substrate 25 can be suppressed. Further, the heat generated in the left semiconductor module 6 is hardly diffused to the lower side of the resin plate 18, therefore performance deterioration and degradation of the ferrite core 17 and the control substrate 25 can be suppressed.

(B-4) In the vehicle drive device 10 described above, the resin plate 18 incorporates therein the shield layer. This can further reduce propagation of the electromagnetic wave to the lower side of the resin plate 18 and the effect of suppressing electromagnetic interference can be further enhanced. Further, since electromagnetic interference to the control substrate 25 is suppressed, it is possible to stably operate the control substrate 25 and to maintain fine performance of the vehicle drive device 10. Since as well as the resin plate 18, the resin member 26 incorporates therein a shield layer, the electromagnetic wave which may act on the control substrate 25 can be reliably weakened and the performance of vehicle drive device 10 can be more reliably maintained.

(B-5) In the vehicle drive device 10 described above, the busbar 20 is inserted from the lower part of the semiconductor modules 6,7 into the interior of the annular-shaped ferrite core 17 and extends downward, and extends toward the rear side of the ferrite core 17. In addition, PN line 9 is connected to the busbar 20 at a position avoiding the ferrite core 17 when seen from below. This structure can connect the PN line 9 to the busbar 20 at a position of approximately the same height as the ferrite core 17, so that the overall PN 9 can be positioned upward. For example, even when an interferer (suspension cross member 29) exists below vehicle drive device 10 as shown in FIG. 2, PN line 9 can be wired without difficulty. Therefore, it is possible to enhance the degree of freedom in the layout of the PN lines 9, the vehicle drive device 10, and various devices (for example, the suspension cross member 29 and the junction box 30) arranged in the vicinity thereof.

(B-6) In the vehicle drive device 10 described above, as shown in FIG. 6, the right semiconductor module 7 is connected to the PN lines 9 via the busbar 20 and the capacitor 5. As described above, by providing the capacitor 5 with the similar power supply function as the busbar 20, it is possible to omit the busbar to connect the left and right semiconductor modules 6,7. As a result, the internal structure of the inverter case 14 can be simplified, and the size and the weight of the vehicle drive device 10 can be further reduced.

3. Modification

The foregoing embodiment is illustrative only and is not intended to preclude the application of various modifications and techniques not explicitly set forth in the present examples. Each configuration of the present embodiment can be variously modified and implemented without departing from the scope thereof. In addition, the configurations of the present embodiment can be selected and omitted as needed, or can be combined appropriately.

For example, the above embodiment illustrates the vehicle drive device 10 that arranges the gearbox 3 offset downward and forward of the vehicle on the basis of the rotating shafts C of the motors 1,2 when seen from the side. Alternatively, the gearbox 3 may be offset downward and rearward of the vehicle. At least, by offsetting the gearbox housing 13 downward from the left and right motor housings 11,12, arrangement of the inverter case 14 using the depressed portion 8 is facilitated and the PN lines 9 are easily connected to the lower surface side of the inverter case 14. Therefore, this alternative can achieve the same actions and effects as those of the above embodiment.

Figure 7:
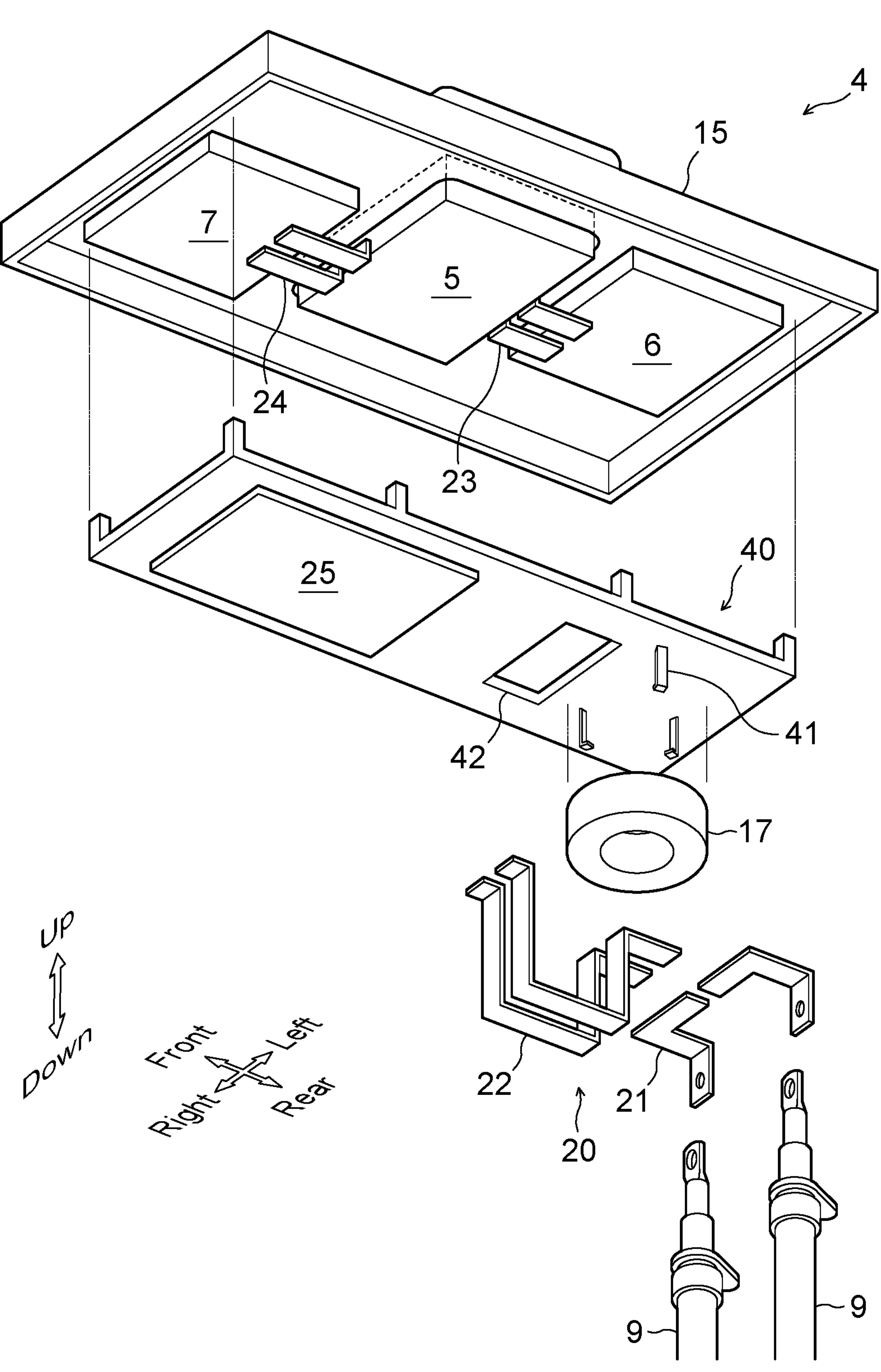
FIG. 7 is an exploded perspective view illustrating an internal structure of an inverter according to a modification.

FIG. 7 is an exploded perspective view illustrating the internal structure of the inverter 4 according to a modification. The resin plate 40 shown in FIG. 7 is a plate-like member having both the function of the resin plate 18 and the function of the resin member 26 in the above-described embodiment. The resin plate 40 holds the ferrite core 17, the busbars 20, and the control substrate 25 of the semiconductor module 6,7. The resin plate 40 is provided projectingly with multiple claw members 41 to lock the ferrite core 17. These claw members 41 allow the ferrite core 17 to be suspended from and fixed to the lower surface of resin plate 40. The resin plate 40 and the ferrite core 17 may be integrated with each other. In addition, an aperture 42 through which the busbars 20 is formed in the vicinity of a point where the ferrite core 17 is attached. The aperture 42 is provided, for example, at a position facing a connecting point between busbars 20 and the left semiconductor module 6.

The busbar 20 illustrated in FIG. 7 includes a pair of first busbars 21, a pair of second busbars 22, a pair of third busbars 23, and a pair of fourth busbars 24. Although the third busbars 23 and the fourth busbars 24 are almost the same as those of the above embodiment, the first busbars 21 and the second busbars 22 are different from those of the above embodiment. Each first busbar 21 is connected to the corresponding PN line 9 via a fastening member and is arranged so as to pass through a gap between the resin plate 40 and the ferrite core 17. Each second busbar 22 is connected to the corresponding first busbar 21 inside the gap, guided to the lower side of the ferrite core 17 through the through-hole of the ferrite core 17, and connected to the left semiconductor module 6 through the aperture 42.

The control substrate 25 is downward suspended from and fixed to the resin plate 40 on the front side of the ferrite core 17. The position of the control substrate 25 is set, for example, under the capacitor 5 or the right semiconductor module 7. Furthermore, the control substrate 25 is arranged on the lower surface side opposite to the upper surface side where the semiconductor modules 6,7 are positioned among the plate surfaces of the resin plate 40. Inside the resin plate 40, a shield layer formed of a magnetic sheet that suppresses noise propagation is provided. The shield layer is formed at least on the upper side of the ferrite core 17 and the upper side of the control substrate 25, and are preferably formed over the entire resin plate 40.

(1) In the above modification, the ferrite core 17, the busbar 20, and the control substrate 25 are held by resin plate 40. Accordingly, multiple components (the ferrite core 17, the busbar 20, the control substrate 25) can be fixed to the resin plate 40 with a simple structure. For example, comparing with a case where a holding member that holds the ferrite core 17 and a holding member that holds the control substrate 25 are separately provided, this modification can reduce the number of components. Furthermore, the number of fastening points (the number of screws) for fixing such multiple holding members to the inverter upper case 15 and the number of operation steps required for the fastening can be reduced.

(2) Further, in the above modification, the control substrate 25 is arranged on an opposite side (lower surface side) of the resin plate 40 to the side where the semiconductor modules 6,7 are arranged. As the above, by separating the control substrate 25 from the semiconductor modules 6,7, performance deterioration and degradation of the control substrate 25 due to heat generating of the semiconductor modules 6,7 can be suppressed.

(3) If the resin plate 40 is integrally formed with the ferrite core 17, the number of components can be reduced, and the number of operation steps required for assembling the inverter 4 can be reduced.

4. Appendix

Appendix 1

A vehicle drive device including:

left and right motor housings that form respective exteriors of left and right motors, the left and right motors driving left and right wheels of a vehicle with electric power of a battery;

a gearbox housing that incorporates therein a gearbox, that is sandwiched between the left and right motor housings, and that is offset downward from the left and right motor housings, the gearbox amplifying torque of the left and right motors and transmitting the amplified torque to the left and right wheels;

an inverter case that incorporates therein a pair of semiconductor modules and an annular ferrite core through which a busbar is inserted, the inverter case being arranged in a depressed portion enclosed by the left and right motor housings and the gearbox housing, the pair of semiconductor modules converting direct current to alternating current and supplying the alternating current to the left and right motors, the busbar supplying electric power to the semiconductor modules; and a PN line that connects the battery to the busbar and that is connected to a lower face side of the inverter case, wherein the ferrite core is arranged below the semiconductor modules.

Appendix 2

The vehicle drive device according to appendix 1, wherein the gearbox housing is offset in a front-rear direction from the left and right motor housings, the PN line is connected to the lower surface side of the inverter case so as to pass through a first space in a bulging shape in a front-rear direction, the first space being enclosed by the left and right motor housings and the gearbox housing, and the ferrite core is at least partly arranged in the first space.

Appendix 3

The vehicle drive device according to appendix 1 or 2, further including a resin plate that is arranged between the semiconductor module and the ferrite core and that is suspended from and fixed to the inverter case.

Appendix 4

The vehicle drive device according to appendix 3, wherein the resin plate holds the ferrite core, the busbar, and a control substrate of the semiconductor module.

Appendix 5

The vehicle drive device according to appendix 4, wherein the control substrate is attached on an opposite plate surface of the resin plate to the semiconductor module.

Appendix 6

The vehicle drive device according to any one of appendices 3-5, wherein the resin plate incorporates therein a shield layer.

Appendix 7

The vehicle drive device according to any one of appendices 3-6, wherein the resin plate is integrated with the ferrite core.

Appendix 8

The vehicle drive device according to any one of appendices 1-7, wherein the busbar is extended downward from a lower portion of the semiconductor module, passing through an interior of the ferrite core, and is extended rearward of the ferrite core, and the PN line is connected to a busbar at a position avoiding the ferrite core when seen from below.

Appendix 9

The vehicle drive device according to any one of appendices 1-8, wherein the inverter case incorporates therein a capacitor, the pair of semiconductor modules are arranged so as to sandwich the capacitor in the front-read direction, and a first one of the pair of semiconductor modules is connected to the PN line via the busbar and a second one of the pair of semiconductor modules is connected to the PN line via the busbar and the capacitor.

DESCRIPTION OF REFERENCE SIGN

1,2: Motor
3: Gearbox
4: Inverter
5: Capacitor
6,7: Semiconductor module
8: Depressed portion
9: PN line
10: Vehicle drive device
11,12: Motor housing
13: Gearbox housing
14: Inverter case
15: Inverter upper case
16: Inverter lower case
17: Ferrite core
18,40: Resin plate
19: Aperture
20: Bus bar
21: First bus bar
22: Second bus bar
23: Third bus bar
24: Fourth bus bar
25: Control substrate
26: Resin member
27: Through-hole
28: Operation through-hole
29: Suspension cross member
30: Junction box
31: First bulging portion
32: Second bulging portion
33: Third bulging portion
34: Box-shaped portion
41: First space
42: Second space

The invention claimed is:

1. A vehicle drive device comprising:

left and right motor housings that form respective exteriors of left and right motors, the left and right motors driving left and right wheels of a vehicle with electric power of a battery;

a gearbox housing that incorporates therein a gearbox, that is sandwiched between the left and right motor housings, and that is offset in a front-rear direction from the left and right motor housings, the gearbox amplifying torque of the left and right motors and transmitting the amplified torque to the left and right wheels;

an inverter case that incorporates therein a pair of semiconductor modules and that is arranged above the left and right motor housings, the pair of semiconductor modules converting direct current to alternating current and supplying the alternating current to the left and right motors; and a PN line that connects the battery to the semiconductor modules from a lower surface side of the inverter case so as to pass through a first space bulging in a front-rear direction, the first space being enclosed by the left and right motor housings and the gearbox housing, wherein the gearbox housing is offset downward from the left and right motor housings, the inverter case is arranged in a second space bulging downward, the second space being enclosed by the left and right motor housings and the gearbox housing, and the PN line is connected to the lower surface side of the inverter case and is wired downward through a position on an opposite side to the gearbox housing in the front-rear direction with respect to the left and right motor housings.

2. The vehicle drive device according to claim 1, further comprising a suspension cross member that supports the left and right wheels of the vehicle via a suspension, the gearbox housing and the left and right motor housings being mounted above the suspension cross member, wherein the PN line is wired to pass above a lower end portion of the suspension cross member.

3. The vehicle drive device according to claim 2, further comprising a junction box that is arranged on a rear side of the inverter case and that relays the electric power from the battery to the semiconductor modules through the PN line, wherein the gearbox housing is offset forward and downward from the left and right motor housings, and the PN line is connected to a rear portion of the lower surface side of the inverter case and is connected to the junction box.

4. The vehicle drive device according to claim 1, wherein the inverter case incorporates therein a ferrite core formed into an annular shape under the semiconductor modules, and the PN line is connected to a position avoiding the ferrite core when seen from below.

5. The vehicle drive device according to claim 1, wherein the inverter case incorporates therein a ferrite core in an annular shape, a busbar that supplies the electric power to the semiconductor modules is inserted through the ferrite core, and the ferrite core is arranged under the semiconductor modules.

6. The vehicle drive device according to claim 5, wherein the ferrite core is at least partly arranged in the first space.

7. The vehicle drive device according to claim 5, further comprising a resin plate that is arranged between the semiconductor modules and the ferrite core and that is suspended from and fixed to the inverter case.

8. The vehicle drive device according to claim 7, wherein the resin plate holds the ferrite core, the busbar, and a control substrate of the semiconductor modules.

9. The vehicle drive device according to claim 8, wherein the control substrate is attached on an opposite plate surface of the resin plate to the semiconductor modules.

10. The vehicle drive device according to claim 7, wherein the resin plate incorporates therein a shield layer.

11. The vehicle drive device according to claim 7, wherein the resin plate is integrated with the ferrite core.

12. The vehicle drive device according to claim 5, wherein the busbar is extended downward from a lower portion of the semiconductor modules, passing through an interior of the ferrite core, and is extended rearward of the ferrite core, and the PN line is connected to the busbar at a position avoiding the ferrite core when seen from below.

13. The vehicle drive device according to claim 5, wherein the inverter case incorporates therein a capacitor, the pair of semiconductor modules are arranged so as to sandwich the capacitor in the front-rear direction, and a first one of the pair of semiconductor modules is connected to the PN line via the busbar and a second one of the pair of semiconductor modules is connected to the PN line via the busbar and the capacitor.

* * * * *